US010941837B2

(12) United States Patent
Sakurai

(10) Patent No.: US 10,941,837 B2
(45) Date of Patent: Mar. 9, 2021

(54) RECLINING APPARATUS

(71) Applicant: SHIROKI CORPORATION, Fujisawa (JP)

(72) Inventor: Noriyuki Sakurai, Fujisawa (JP)

(73) Assignee: SHIROKI CORPORATION, Fujisawa (JP)

(*) Notice: Subject to any disclaimer, the term of this patent is extended or adjusted under 35 U.S.C. 154(b) by 88 days.

(21) Appl. No.: 16/349,211

(22) PCT Filed: Oct. 24, 2017

(86) PCT No.: PCT/JP2017/038308
§ 371 (c)(1),
(2) Date: May 10, 2019

(87) PCT Pub. No.: WO2018/092526
PCT Pub. Date: May 24, 2018

(65) Prior Publication Data
US 2019/0285145 A1  Sep. 19, 2019

(30) Foreign Application Priority Data

Nov. 17, 2016 (JP) .............................. JP2016-224106

(51) Int. Cl.
*F16H 3/44* (2006.01)
*A47C 1/024* (2006.01)
(Continued)

(52) U.S. Cl.
CPC ................. *F16H 3/44* (2013.01); *A47C 1/02* (2013.01); *A47C 1/024* (2013.01); *A47C 7/40* (2013.01); *B60N 2/225* (2013.01)

(58) Field of Classification Search
CPC .. F16H 3/44; A47C 1/02; A47C 1/024; A47C 1/025; A47C 1/026; A47C 7/40;
(Continued)

(56) References Cited

U.S. PATENT DOCUMENTS 8,911,319 B2    12/2014  Chae et al.
9,302,599 B2 *   4/2016  Mase .................... B60N 2/2362
(Continued)

FOREIGN PATENT DOCUMENTS

JP   2008-543456 A   12/2008
JP   2010-022392 A    2/2010
(Continued)

OTHER PUBLICATIONS

International Search Report (ISR) (PCT Form PCT/ISA/210), in PCT/JP2017/038308, dated Dec. 5, 2017 (English-language version).

(Continued)

*Primary Examiner* — Mark R Wendell
(74) *Attorney, Agent, or Firm* — McGinn IP Law Group, PLLC

(57) ABSTRACT

A reclining apparatus (51) includes: an internal gear (61) that has internal teeth (61c) which are formed on an inner peripheral surface thereof; an external gear (63) that has external teeth (63a) which have a smaller number of teeth than that of the internal teeth (61c) and are formed on an outer peripheral surface thereof; a first wedge (71) and a second wedge (73) that are provided so as to be movable along a peripheral direction in an eccentric annular space between the internal gear (61) and the external gear (63); and a striker (79) that has a pressing portion having a pair of first protrusion portions and second protrusion portions capable of pressing the first wedge (71) and the second wedge (73). The striker (79) has a plurality of the pressing portions (81, 83).

6 Claims, 13 Drawing Sheets

(51) Int. Cl.
*A47C 7/40* (2006.01)
*B60N 2/225* (2006.01)
*A47C 1/02* (2006.01)

(58) Field of Classification Search
CPC ...... B60N 2/225; B60N 2/2252; B60N 2/235; B60N 2/2254; B60N 2/2352; B60N 2/2356; B60N 2/2213; B60N 2/2231; B60N 2/2251
USPC .... 297/362, 374, 367 R, 366, 361.1, 354.12, 297/354.1, 368, 369
See application file for complete search history.

(56) References Cited

U.S. PATENT DOCUMENTS

| | | | |
|---|---|---|---|
| 9,706,844 B2* | 7/2017 | Sakurai | A47C 1/024 |
| 2006/0158012 A1* | 7/2006 | Kawashima | B60N 2/2252 |
| | | | 297/362 |
| 2007/0108824 A1* | 5/2007 | Lange | B60N 2/2252 |
| | | | 297/367 R |
| 2008/0136241 A1 | 6/2008 | Stemmer et al. | |
| 2008/0136242 A1 | 6/2008 | Stemmer et al. | |
| 2009/0224588 A1* | 9/2009 | Matsumoto | B60N 2/2254 |
| | | | 297/362 |
| 2010/0013288 A1 | 1/2010 | Mitsuhashi | |
| 2012/0007402 A1* | 1/2012 | Stilleke | B60N 2/2252 |
| | | | 297/362 |
| 2013/0033081 A1* | 2/2013 | Aoi | A47C 1/024 |
| | | | 297/354.1 |
| 2013/0106161 A1* | 5/2013 | Ohba | B60N 2/2254 |
| | | | 297/362 |
| 2014/0097659 A1* | 4/2014 | Wahls | B60N 2/2252 |
| | | | 297/362 |
| 2014/0162827 A1 | 6/2014 | Wingensiefen | |
| 2014/0225411 A1* | 8/2014 | Matt | B60N 2/20 |
| | | | 297/362 |
| 2015/0091354 A1* | 4/2015 | Enokijima | B60N 2/2252 |
| | | | 297/354.12 |
| 2015/0291063 A1* | 10/2015 | Enokijima | B60N 2/2254 |
| | | | 297/361.1 |
| 2015/0298583 A1* | 10/2015 | Kim | B60N 2/2254 |
| | | | 297/362 |
| 2016/0059743 A1* | 3/2016 | Tsuji | B60N 2/2252 |
| | | | 297/362 |
| 2016/0200222 A1* | 7/2016 | Desquesne | B60N 2/2362 |
| | | | 297/354.12 |
| 2016/0272089 A1* | 9/2016 | Kim | B60N 2/2252 |

FOREIGN PATENT DOCUMENTS

| | | |
|---|---|---|
| JP | 2012-255543 A | 12/2012 |
| JP | 2014-520723 A | 8/2014 |
| JP | 2016-049797 A | 4/2016 |

OTHER PUBLICATIONS

Written Opinion of the International Searching Authority (PCT Form PCT/ISA/237), in PCT/JP2017/038308, dated Dec. 5, 2017.

* cited by examiner

RECLINING APPARATUS

TECHNICAL FIELD

The present disclosure relates to a Taumel type reclining apparatus that changes a tilt angle of a seat back with respect to a seat cushion.

BACKGROUND ART

The Taumel type reclining apparatus is provided with an internally-teethed gear on one side of a seat cushion side and a seat back side, and an external gear whose number of teeth is smaller than that of the internal gear and which is engaged with the internal gear on the other side of the seat cushion side and the seat back side, and changes a tilt angle of the seat back with respect to the seat cushion by changing an engaging position of the internal gear and the external gear while eccentrically moving one of the internal gear and the external gear around a rotation axis of the other one of the gears.

As illustrated in FIG. 13, a pair of wedge (wedge-shaped member) 5 and wedge (wedge-shaped member) 7 are disposed in an eccentric annular space between an inner surface of a circular hole 1a of an internal gear 1 and an outer surface of a cylinder 3a of the external gear 3. The pair of wedge 5 and wedge 7 are biased by a spring 9 in a driving direction (an arrow A direction and an arrow B direction) of the wedge into a narrow portion of the eccentric annular space.

The wedges 5 and 7 are biased in a direction in which the internal gear 1 and the external gear 3 increases eccentricity between the rotation axes of both gears by pressing the internal surface of the circular hole 1a and the outer surface of the cylinder 3a, respectively to deeply engage internal teeth 1b of the internal gear 1 and external teeth 3b of the external gear 3 with each other and therefore the seat back does not tilt (locked state: inactive state).

In a striker (unlocking member) 11, an abutting surface 11a and an abutting surface 11b push an end surface 5a or an end surface 7a of a wedge distal end side of the wedge 5 and the wedge 7 against a biasing force of the spring 9 to puss the wedge 5 or the wedge 7 in a wedge pulling-out direction (a direction reverse to the driving direction: a reverse direction to the arrow A or arrow B direction). When the wedge 5 or the wedge 7 is pushed and moved by the striker 11, pressing forces of the wedge 5 or the wedge 7 against the inner surface of the circular hole 1a and the outer surface of the cylinder 3a are reduced, the engagement between the internal teeth 1b and the external teeth 3b becomes shallow, and the seat back becomes in a tiltable state.

At the start of movement of the wedge 5 or the wedge 7, the other one of the wedge 7 or the wedge 5 is stationary due to friction with the inner surface of the circular hole 1a and the outer surface of the cylinder 3a. However, when one wedge moves in the wedge pulling-out direction, the other wedge moves in the driving direction of the wedge into the eccentric annular space by an elastic repulsive force of the spring 9. While the operation is repeated, the engagement part changes while maintaining the eccentric state between the internal gear and the external gear to tilt the seat back (Unlocked State: Operating State) (refer to, for example, Patent Literature 1).

CITATION LIST

Patent Literature

Patent Literature 1: JP-A-2010-22392

SUMMARY

Technical Problem

However, in the locked state of the reclining apparatus having the configuration illustrated in FIG. 13, in a state where the abutting surface 11a and the abutting surface 11b of the striker 11 abut against the end surface 5a and the end surface 7a on the wedge distal end sides of the wedge 5 and the wedge 7, the wedge 5 and the wedge 7 are insufficiently driven and do not function as wedges, and a lock failure state occurs.

Accordingly, in the locked state, the assembly is performed such that a gap G1 and a gap G2 are necessarily provided between the abutting surface 11a and the abutting surface 11b of the striker 11 and the end surface 5a and the end surface 7a on the wedge distal end sides of the wedges 5 and 7. Meanwhile, due to the gap G1 and the gap G2, a time lag occurs until the seat back starts to tilt after the striker 11 starts to rotate.

In addition, due to the dimensional errors of the internal gear 1, the external gear 3, the wedges 5 and 7, and the striker 11, the positions of the wedge 5 and the wedge 7 in the locked state (also referred to as a wedge lock position) vary. Specifically, in FIG. 13, the positions of the wedge 5 and the wedge 7 in an up-down direction (indicated by the arrow UL) vary in the locked state. In other words, in FIG. 13, when the lock positions of the wedge 5 and the wedge 7 are low, the gap G1 and the gap G2 become narrower, and the time lag becomes shorter. In addition, when the lock positions of the wedge 5 and the wedge 7 are extremely low, the end surface 5a and the end surface 7a of the wedge 5 and the wedge 7 interfere (contact) with the abutting surface 11a and the abutting surface 11b of the striker 11, and a lock failure occurs in some cases. Conversely, when the lock positions of the wedge 5 and the wedge 7 are high, the gap G1 and the gap G2 become wider, and the time lag becomes longer.

In order to respond to the above, when assembling the reclining apparatus, a plurality of types of wedges having different dimensions are prepared, and a wedge is appropriately selected in accordance with the degree of variation. However, since a plurality of types of wedges having different dimensions are necessary, there is a problem that the number of components increases.

The present disclosure provides a reclining apparatus capable of reducing the number of components.

Solution to Problem

A reclining apparatus according to one aspect of the present disclosure includes: an internal gear, which has internal teeth formed on an inner peripheral surface thereof, is provided in a member on one side of a seat cushion side and a seat back side, and is formed in any one shape of a circular hole and a cylinder; an external gear, which is engaged with the internal teeth of the internal gear, has external teeth that has a smaller number of teeth than that of the internal teeth and are formed on an outer peripheral surface thereof, and on which a cylinder to be inserted into a circular hole is formed in a case where the circular hole is formed in the internal gear, and a circular hole into which a cylinder is inserted is formed in a case where the cylinder is formed in the internal gear, and which is provided in a member on the other side of the seat cushion side and the sea back side; a first wedge and a second wedge, which are provided to be movable along a peripheral direction in an eccentric annular space between an inner surface of the circular hole and an outer surface of the cylinder; a biasing member, which biases the first wedge and the second wedge in a direction into a narrow portion of the eccentric annular space; and a striker, which has a pressing portion having a pair of first protrusion portions and second protrusion portions capable of pressing the first wedge and the second wedge. The striker has a plurality of the pressing portions.

DESCRIPTION OF EMBODIMENTS

First Embodiment

Figure 7:
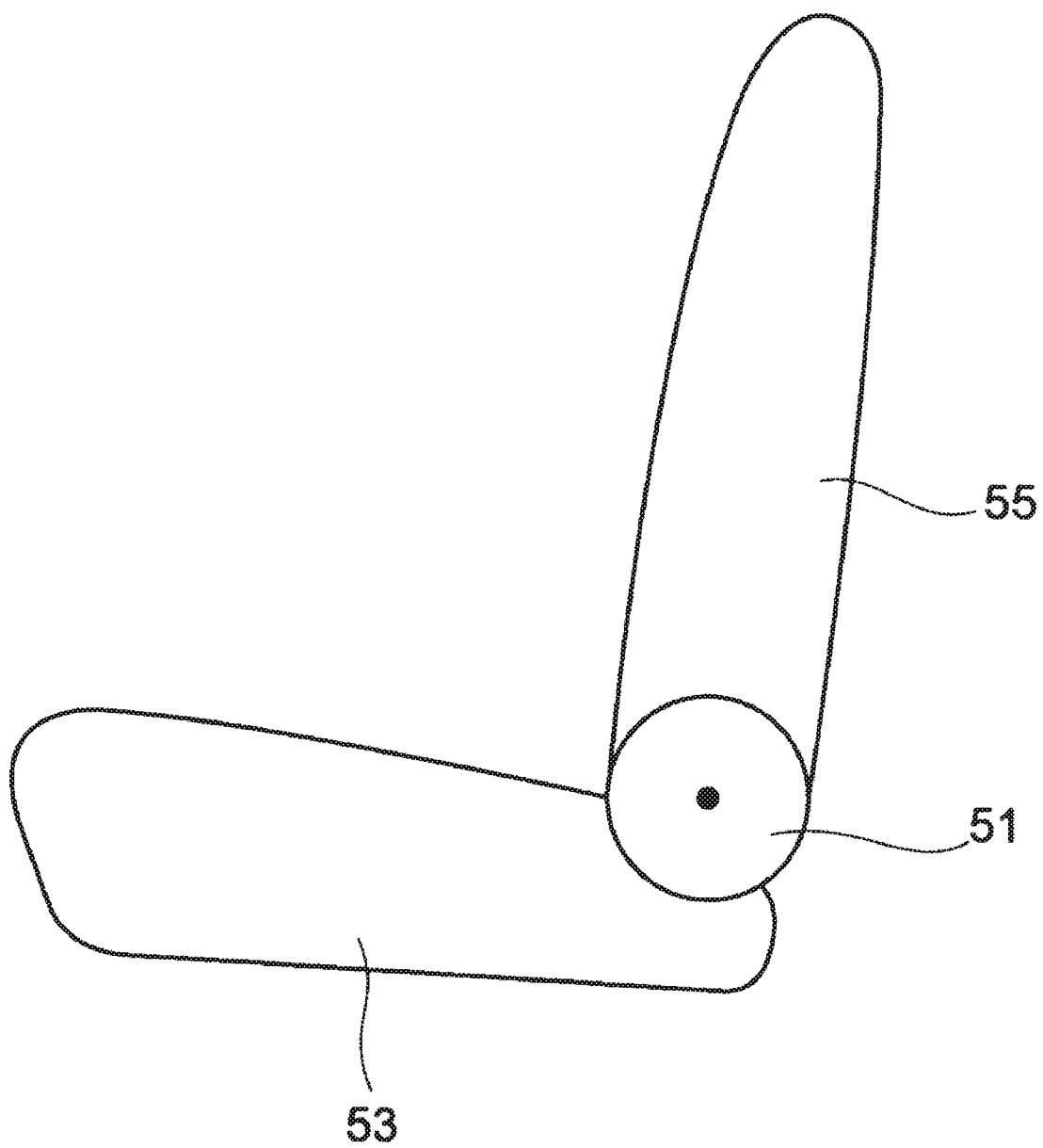
FIG. 7 is a side view of a main portion of a seat to which the reclining apparatus of the embodiment is assembled.

First, with reference to FIG. 7, a seat provided with a reclining apparatus of the embodiments will be described. FIG. 7 is a side view of a main portion of the seat to which the reclining apparatus of the embodiment is assembled. As illustrated in FIG. 7, a reclining apparatus 51 is provided between a seat cushion 53 and a seat back 55.

Figure 1:
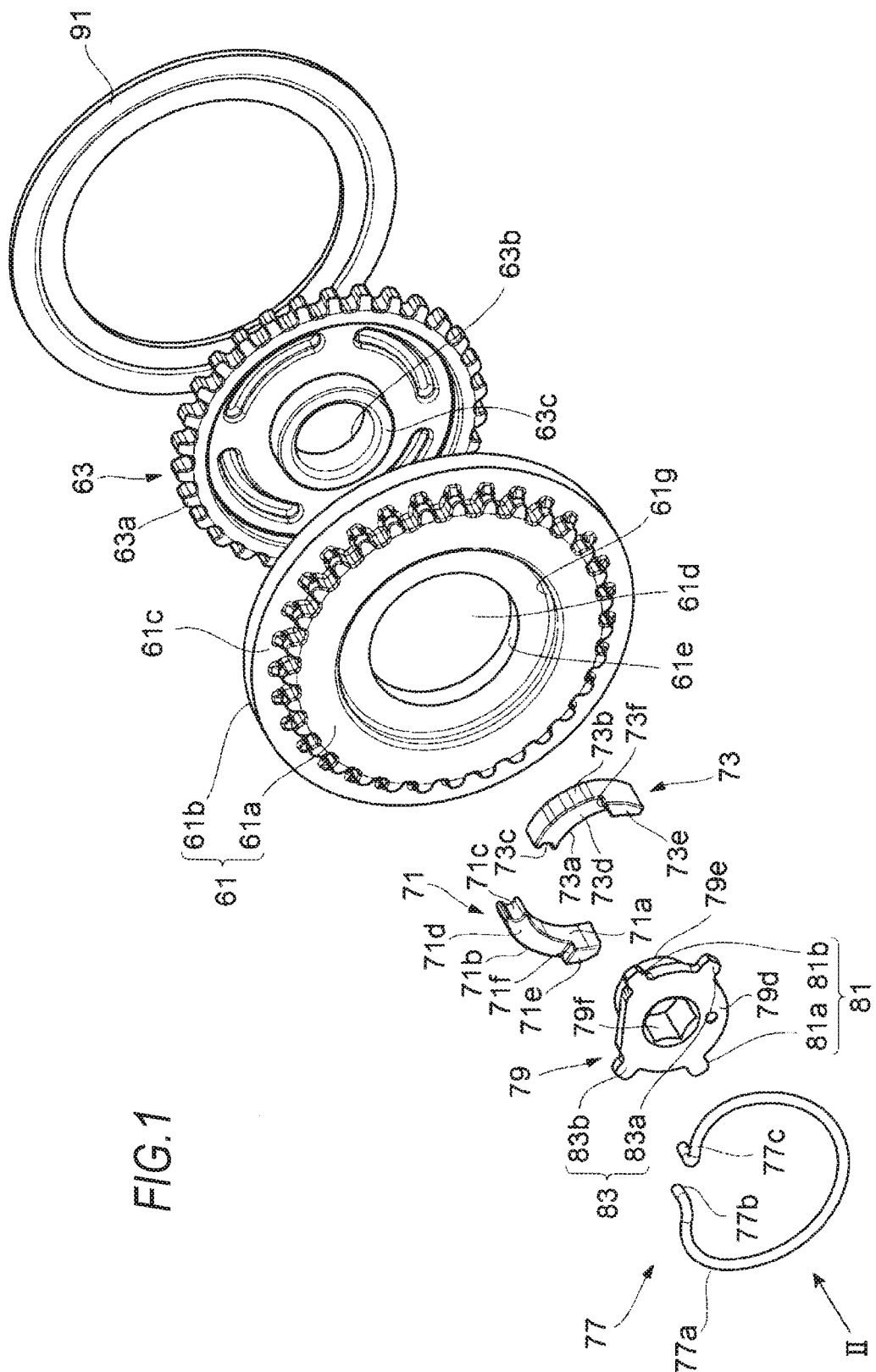
FIG. 1 is an exploded perspective view of a reclining apparatus of a first embodiment.
Figure 2:
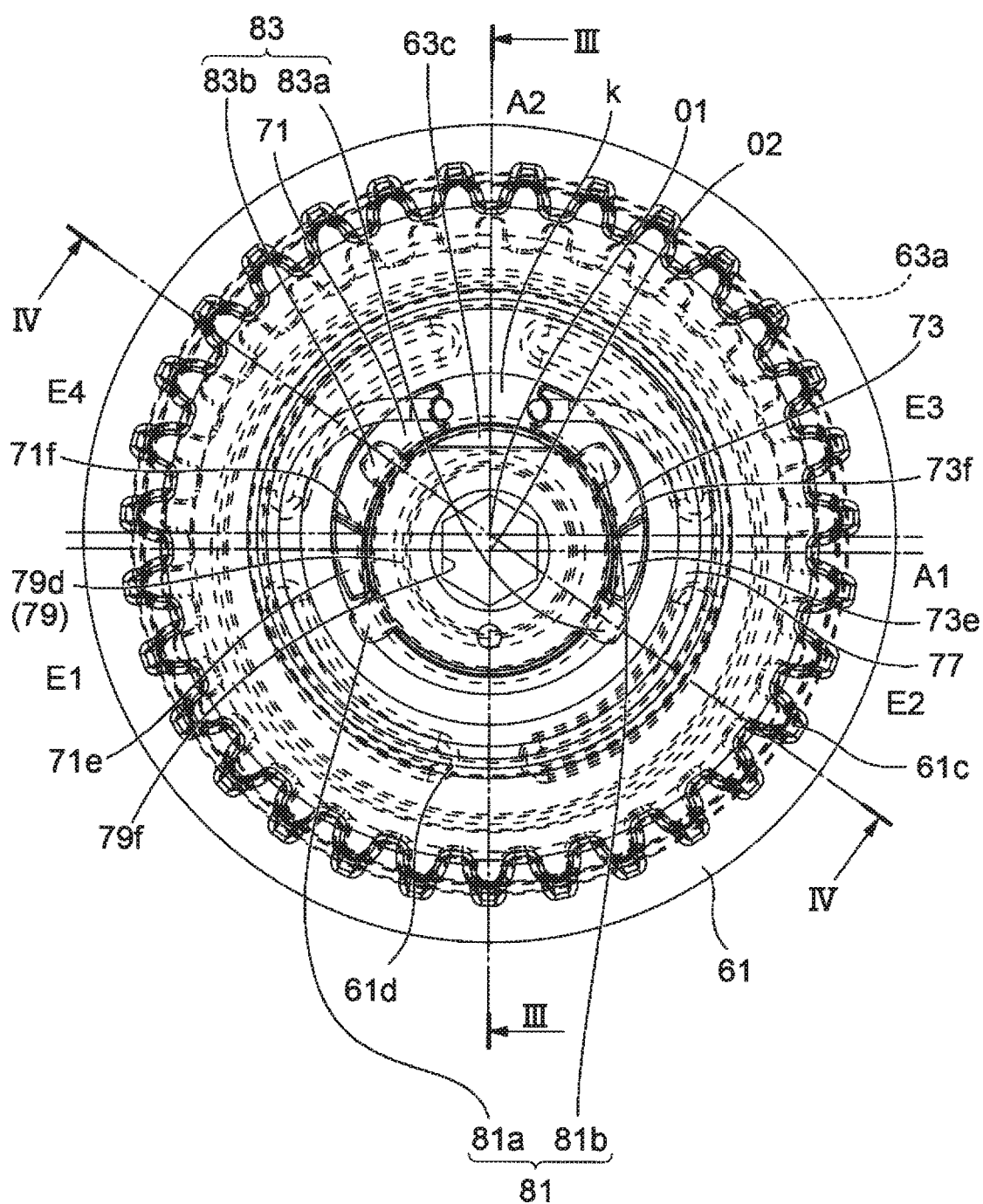
FIG. 2 is a front view of the assembled reclining apparatus of FIG. 1 as viewed in an arrow II direction.
Figure 3:
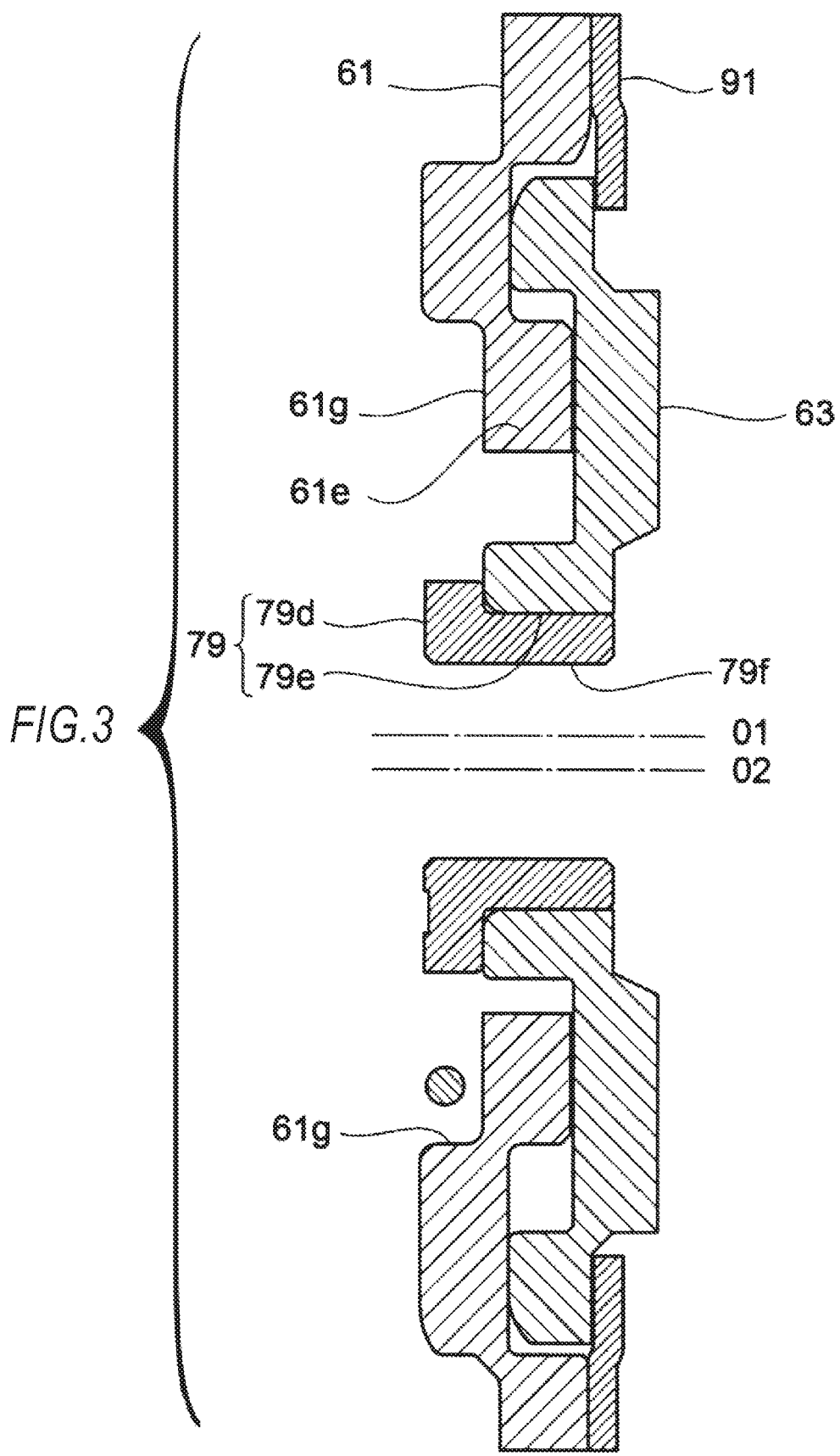
FIG. 3 is an end view taken along line III-III of FIG. 2.
Figure 4:
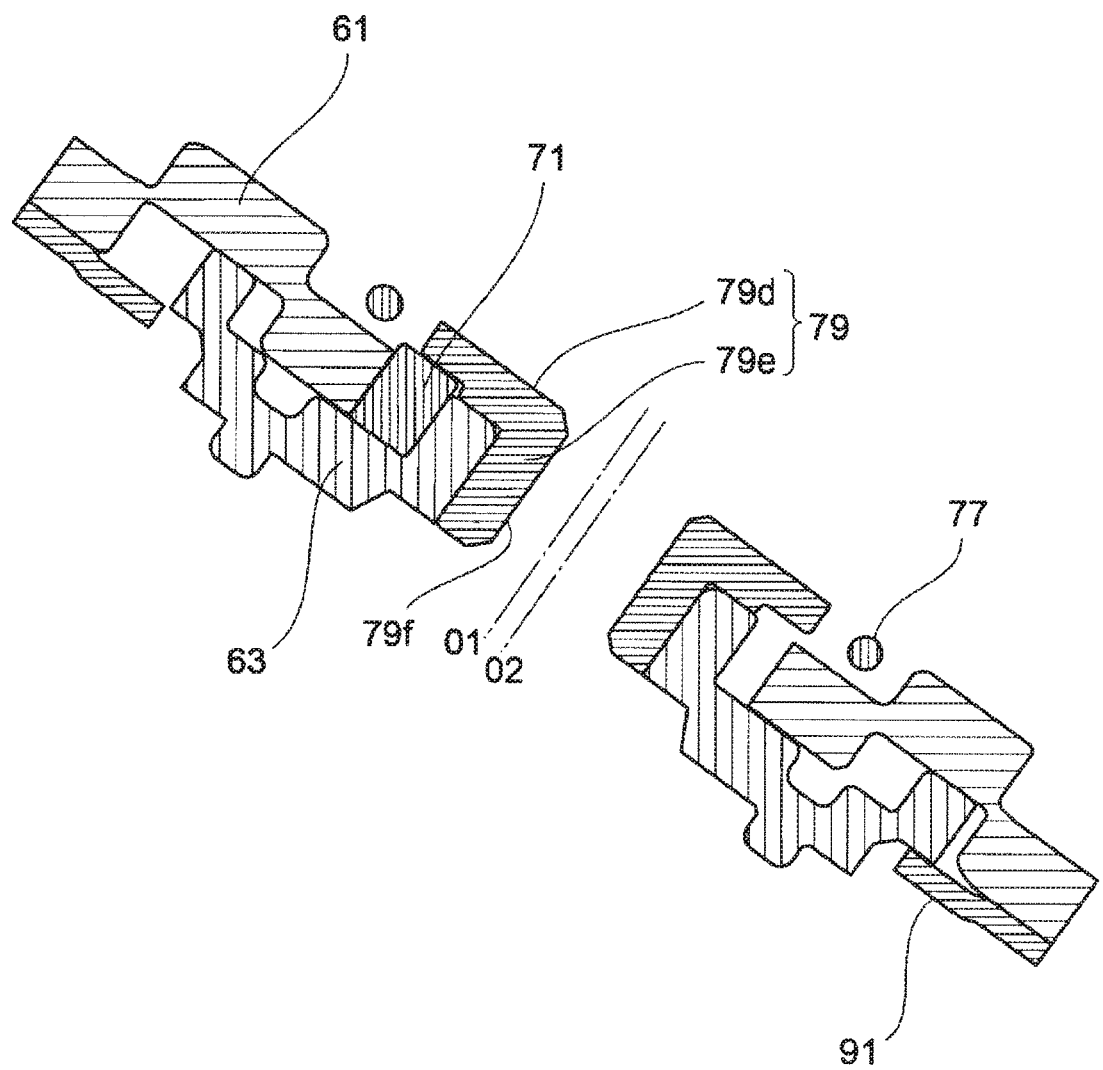
FIG. 4 is an end view taken along line IV-IV of FIG. 2.

Next, the reclining apparatus 51 will be described with reference to FIGS. 1 to 4. FIG. 1 illustrates an exploded perspective view of a reclining apparatus of a first embodiment. FIG. 2 illustrates a front view of the assembled reclining apparatus of FIG. 1 as viewed in an arrow II direction. FIG. 3 illustrates an end view taken along line III-III of FIG. 2. FIG. 4 illustrates an end view taken along line IV-IV of FIG. 2.

In FIG. 1, an internal gear 61 provided on the seat back 55 side is configured with a circular bottom portion 61a and a cylindrical standing wall portion 61b formed along the peripheral portion of the bottom portion 61a, and is made in a substantially bottomed cylindrical shape in which one surface thereof is an open surface. On the inner peripheral surface of the standing wall portion 61b, internal teeth 61c are formed over the entire region in a peripheral direction. In addition, a penetrating hole 61d is formed at the center of the bottom 61a of the internal gear 61. A cylindrical standing wall portion 61e that protrudes toward the open surface direction is formed along the inner peripheral surface of the hole 61d. A circular hole is formed inside the cylindrical standing wall portion 61e.

Inside the bottomed cylindrical internal gear 61, an external gear 63 provided on the seat back 55 side is disposed. On an outer surface of the external gear 63, external teeth 63a are formed over the entire region in the peripheral direction. In addition, the external teeth 63a of the external gear 63 can be engaged with the internal teeth 61c of the internal gear 61. Furthermore, the number of external teeth 63a of the external gear 63 is set to be smaller than the number of internal teeth 61c of the internal gear 61. In addition, a penetrating hole 63b is formed at a center portion of the external gear 63. On a surface side facing the internal gear 61 in the external gear 63, a cylindrical standing wall portion 63c that protrudes in the direction toward the internal gear 61 is formed along an edge portion of an opening of the hole 63b. The outer diameter of the cylindrical standing wall portion 63c is set to be smaller than the inner diameter of the cylindrical standing wall portion 61e of the internal gear 61, and the cylindrical standing wall portion 63c of the external gear 63 functions as a cylinder that is inserted into the cylindrical standing wall portion 61e of the internal gear 61 which is a circular hole.

In addition, as illustrated in FIG. 2, in a state where the external teeth 63a of the external gear 63 are engaged with the internal teeth 61c of the internal gear 61, positions of a rotation axis (center of the cylindrical standing wall portion 61e (circular hole)) θ1 of the internal gear 61 and a rotation axis (center of the standing wall portion 63c) θ2 of the external gear 63 are different and are eccentric to each other. Accordingly, an eccentric annular space K is formed between the inner surface of the cylindrical standing wall portion 61e (circular hole) of the internal gear 61 and the outer surface of the cylindrical standing wall portion 63c (cylinder) of the external gear 63.

As illustrated in FIGS. 1 and 2, a first wedge 71 and a second wedge 73 are provided so as to be movable in the peripheral direction on the eccentric annular space K. The first wedge 71 and the second wedge 73 have a surface-symmetrical shape. An inner surface 71a and an inner surface 73a of the first wedge 71 and the second wedge 73 have inner diameters substantially the same as the outer diameter of the standing wall portion 63c of the external gear 63. Further, an outer surface 71b and an outer surface 73b of the first wedge 71 and the second wedge 73 have diameters that are larger than the diameters of the inner surface 71a and the inner surface 73a and have different centers, and thicknesses of the first wedge 71 and the second wedge 73 change to be a wedge shape.

Figure 10:
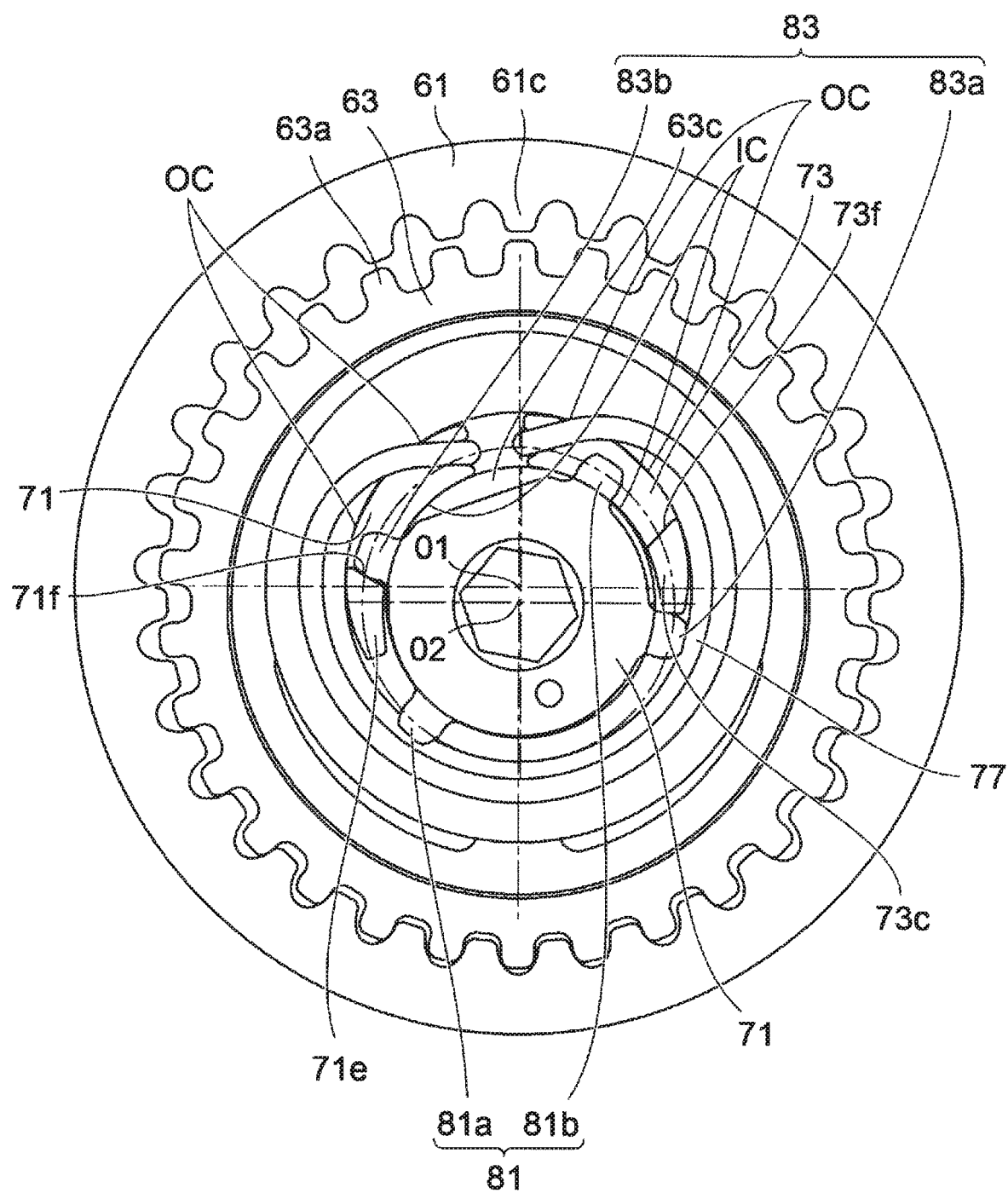
FIG. 10 is a view showing a wedge illustrated in FIG. 1 held in an eccentric annular space.

In the present embodiment, as illustrated in FIG. 10 which is a view showing the wedge illustrated in FIG. 1 held in the eccentric annular space, outer contact points (OC) that abut against the inner surface of the standing wall portion 61e of the internal gear 61 are formed at two locations on the outer surface 71b and the outer surface 73b of the first wedge 71 and the second wedge 73, and an inner contact point (IC) that abuts against the outer surface of the standing wall portion 63c of the external gear 63 is formed at one location on the inner surface 71a and the inner surface 73a of the first wedge 71 and the second wedge 73. Furthermore, the inner contact point (IC) is positioned between the two outer contact points (OC). The first wedge 71 and the second wedge 73 are stably held in the eccentric annular space K at the three contact points.

In addition, when the first wedge 71 and the second wedge 73 move in a direction of being separated from each other, that is, in a driving direction of the wedge into the narrow portion of the eccentric annular space K, the internal gear 61 and the external gear 63 relatively move in a direction in which the internal teeth 61c and the external teeth 63a are engaged with each other.

The first wedge 71 and the second wedge 73 receive a biasing force in a direction of being separated from each other from a spring 77 which elastically returns in a diameter expansion direction. The spring 77 includes an annular part 77a of one turn, and an end portion 77b and an end portion 77c that rise up from the annular part 77a. The annular part 77a is accommodated in a groove 61g formed along the opening of the cylindrical standing wall portion 61e (circular hole) of the internal gear 61. In addition, the end portion 77b is locked to a groove portion 71c formed on a thick side end surface of the first wedge 71, and the end portion 77c is locked to a groove portion 73c formed on a thick side end surface of the second wedge 73.

In addition, on thin sides of the upper surface (surface exposed to the groove 61g) 71d and the upper surface 73d that face the groove 61g side of the internal gear 61 of the first wedge 71 and the second wedge 73, a protrusion portion 71e and a protrusion portion 73e that protrude toward the groove 61g side are formed. Therefore, on the upper surface 71d and the upper surface 73d of the first wedge 71 and the second wedge 73, except for the protrusion portion 71e and the protrusion portion 73e, a recess portion that penetrates in a radial direction is formed. Furthermore, a standing wall portion 71f and a standing wall portion 73f of the protrusion portion 71e and the protrusion portion 73e are pressed portions which can be pressed by pressing portions of a striker which will be described later.

As illustrated in FIGS. 1 to 4, a striker 79 includes a main body portion 79d disposed in the groove 61g of the internal gear 61 and a cylindrical portion 79e connected to the main body portion 79d and fitted to the inside of the standing wall portion 63c of the external gear 63. Accordingly, the rotation axis of the striker 79 becomes the rotation axis θ2 of the external gear 63. The cross-sectional shape of an inner tubular portion of the cylindrical portion 79e is non-circular (in the present embodiment, a regular hexagon), and becomes a fitting hole 79f to which a driving shaft (not illustrated) is fitted to transmit the rotation of the driving shaft thereto. In addition, as illustrated in FIG. 2, the cross-sectional shape of the fitting hole 79f is symmetrical with a axis orthogonal to the rotation axis θ2 of the striker 79, for example, a first axis A1, as a symmetrical axis.

On an outer edge of the main body portion 79d, a plurality (two sets in the present embodiment) of pressing portions each configured with a first protrusion portion and a second protrusion portion capable of pressing the first wedge 71 and the second wedge 73 are formed.

One pressing portion 81 of the two sets of pressing portions in the present embodiment has a first protrusion portion 81a and a second protrusion portion 81b that protrude in the radial direction from the outer edge portion of the main body portion 79d. As the striker 79 rotates clockwise in FIG. 1, the first protrusion portion 81a presses the end surface on the wedge distal end side of the first wedge 71, and the first wedge 71 is moved in a pulling-out direction of the wedge from the narrow portion of the eccentric annular space K. In addition, as the second protrusion portion 81b overlaps the recess portion of the second wedge 73 and the striker 79 rotates clockwise in FIGS. 1 and 2, the standing wall portion 73f of the protrusion portion 73e is pressed, and the second wedge 73 is moved in the driving direction of the wedge into the narrow portion of the eccentric annular space K.

The other pressing portion 83 of the two sets of pressing portions in the present embodiment has a first protrusion portion 83a and a second protrusion portion 83b that protrude in the radial direction from the outer edge portion of the main body portion 79d. As the striker 79 rotates counterclockwise in FIG. 1, the first protrusion portion 83a presses the end surface on the wedge distal end side of the second wedge 73, and the second wedge 73 is moved in the pulling-out direction of the wedge from the narrow portion of the eccentric annular space K. In addition, as the second protrusion portion 83b overlaps the recess portion of the first wedge 71 and the striker 79 rotates counterclockwise in FIG. 1, the standing wall portion 71f of the protrusion portion 71e is pressed, and the first wedge 71 is moved in the driving direction of the wedge into the narrow portion of the eccentric annular space K.

The pair of first protrusion portion 81a and the second protrusion portion 81b constituting the pressing portion 81 are provided within the range of 180 degrees in the rotational direction of the striker 79. Similarly, the pair of first protrusion portion 83a and the second protrusion portion 83b constituting the pressing portion 83 are also provided within the range of 180 degrees in the rotational direction of the striker 79.

As illustrated in FIG. 2, in four regions (in FIG. 2, regions E1 to E4) divided by two axes (in FIG. 2, a first axis A1 and a second axis A2) orthogonal to the rotation axis θ2 of the striker 79 and orthogonal to each other within the plane of the rotation of the striker 79, the first protrusion portion 81a of the pressing portion 81 is positioned in one region (region E1) of one set of two regions (region E1, region E3) having vertically-opposite angles, and the second protrusion portion 81b of the pressing portion 81 is positioned in the other region (region E3). In addition, the first protrusion portion 83a of the pressing portion 83 is positioned in one of the other set of two regions (region E2, region E4) having vertically-opposite angles, and the second protrusion portion 83b of the pressing portion 83 is positioned in the other region (region E4).

Figure 8:
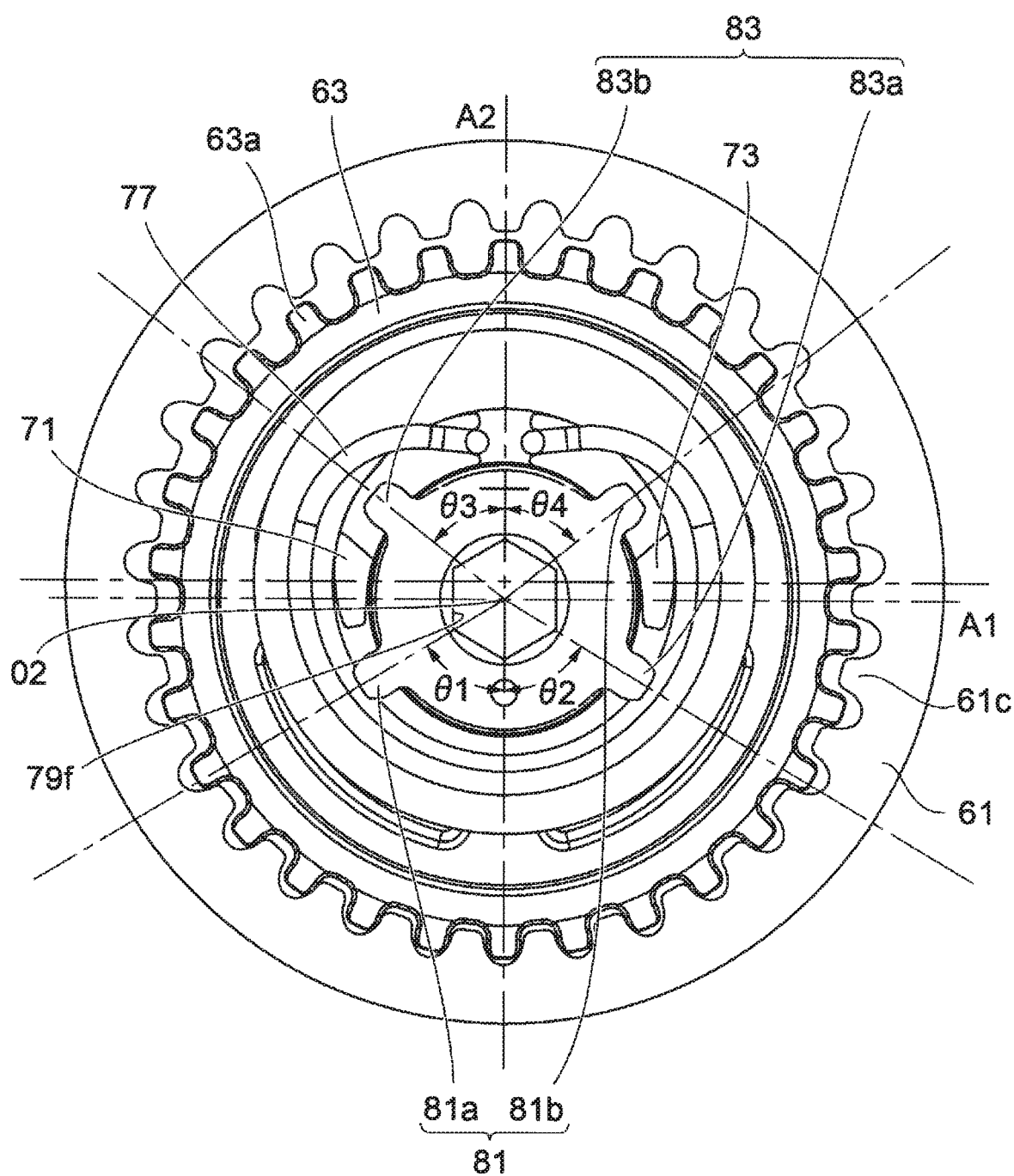
FIG. 8 is a view showing a striker when a wedge lock position is high in the configuration view of FIG. 2.

As illustrated in FIG. 8 which is a configuration view of FIG. 2, in the two sets of pressing portion 81 and pressing portion 83, when an angle at which a straight line passing through the first protrusion portion 81a (center portion in the peripheral direction in the protrusion portion) of the one pressing portion 81 and the center (rotation axis) θ2 of the fitting hole 79f intersects the second axis A2 is θ1, an angle at which a straight line passing through the first protrusion portion 83a (center portion in the peripheral direction in the protrusion portion) of the other pressing portion 83 and the center of the fitting hole 79f intersects the second axis A2 is θ2, an angle at which a straight line passing through the second protrusion portion 83b (center portion in the peripheral direction in the protrusion portion) of the other pressing portion 83 and the center of the fitting hole 79f intersects the second axis A2 is θ3, and an angle at which a straight line passing through the second protrusion portion 81b of one pressing portion 81 and the center of the fitting hole 79f intersects the second axis A2 is θ4,

θ1=θ2,

θ3=θ4, and

θ1=θ2≠θ3=θ4.

Furthermore,

θ1=θ2>θ3=θ4 is satisfied.

By satisfying θ1=θ2 and θ3=θ4, even when the striker 79 is rotated by 180 degrees from the state of the striker 79 illustrated in FIGS. 1 to 4 and FIG. 8 to change the position, the first wedge 71 and the second wedge 73 can be pressed and moved.

Figure 9:
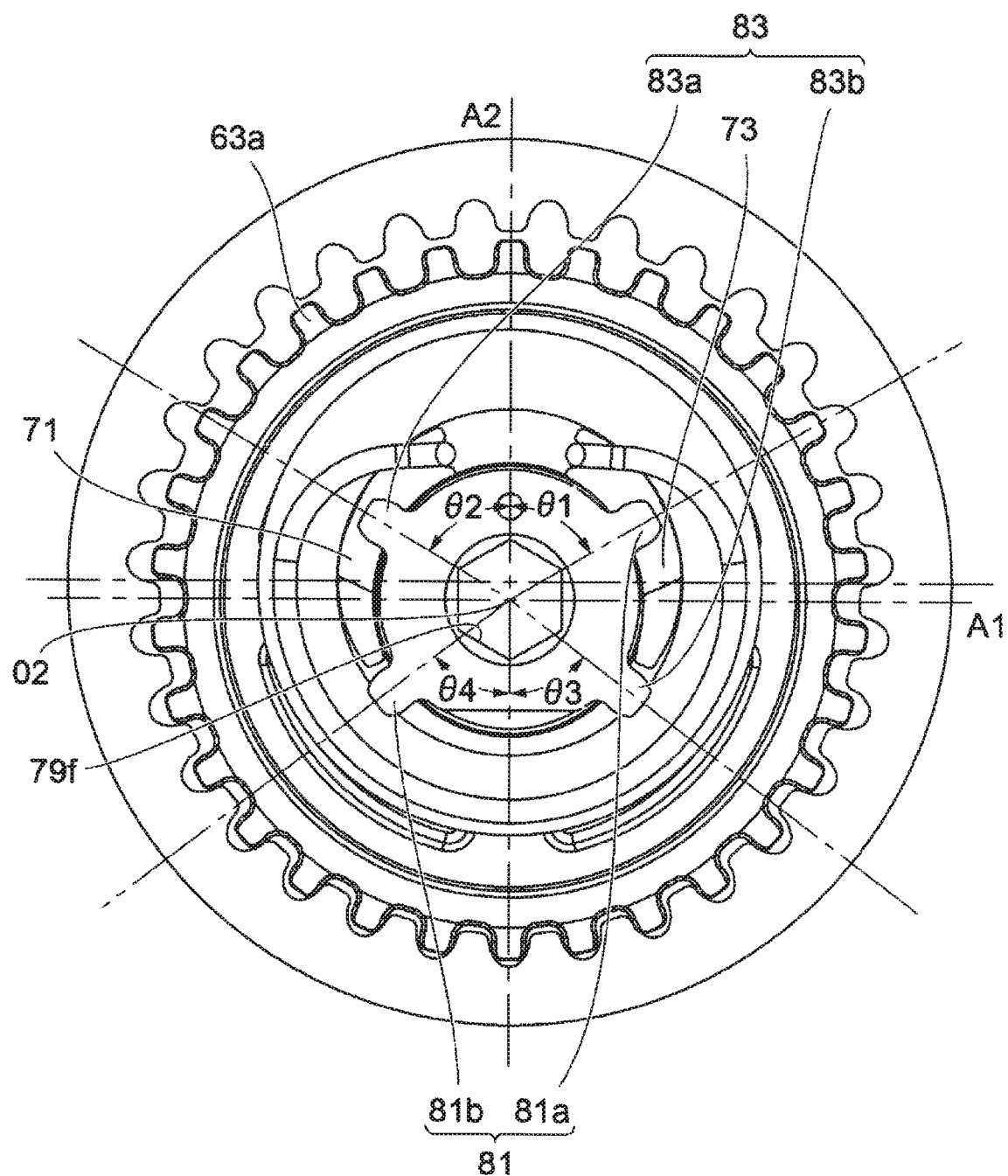
FIG. 9 is a view showing the striker when the wedge lock position is low in the configuration view of FIG. 2.

At this time, since θ1=θ2>θ3=θ4, as illustrated in FIG. 8, if the wedge lock position is high, it is sufficient that the first protrusion portion 81a of the pressing portion 81 and the first protrusion portion 83a of the pressing portion 83, in which the angles at which the straight line passing through the protrusion portion and the center of the fitting hole 79f intersects the second axis A2 are large θ1 and θ2, press the end surfaces on the wedge distal end sides of the first wedge 71 and the second wedge 83. In addition, as illustrated in FIG. 9, when the wedge lock position is low, it is sufficient that the second protrusion portion 81b of the pressing portion 81 and the second protrusion portion 83b of the pressing portion 83, in which the angles at which the straight line passing through the protrusion portion and the center of the fitting hole 79f intersects the second axis A2 are large θ3 and θ4, press the end surfaces on the wedge distal end sides of the first wedge 71 and the second wedge 83.

Furthermore, the cross-sectional shape of the fitting hole 79f is symmetrical with the first axis A1 as a symmetrical axis. Accordingly, even when the striker 79 is rotated by 180 degrees from the state of the striker 79 illustrated in FIGS. 1 to 4 and FIG. 8 to change the position, the shape of the fitting hole 79f does not change, and the driving shaft can be fitted without any problem.

Further, as illustrated in FIG. 10, in the present embodiment, the standing wall portion 71f and the standing wall portion 73f of the protrusion portion 71e and the protrusion portion 73e of the first wedge 71 and the second wedge 73, which are pressed portions to be pressed by the pressing portion of the striker 79, are inclined surfaces inclined in a longitudinal direction of the wedge. On the inclined surface, when the pressing portions of the striker 79 perform the pressing, the first wedge 71 and the second wedge 73 are the inclined surfaces to be pressed against any one of the inner surface of the cylindrical standing wall portion 61e (circular hole) of the internal gear 61 and the outer surface of the cylindrical standing wall portion 63c (cylinder) of the external gear 63.

Further, in the present embodiment, the pressing portions of the striker 79 are set to perform the pressing at a position separated from an intermediate portion in the radial direction in the standing wall portion 71f and the standing wall portion 73f of the protrusion portion 71e and the protrusion portion 73e of the first wedge 71 and the second wedge 73 which are inclined surfaces.

In addition, in the present embodiment, the first wedge 71 and the second wedge 73 are set so as to press against the inner surface of the cylindrical standing wall portion 61e (circular hole) of the internal gear 61 on the seat back 55 side that does not perform an eccentric rotation motion.

Furthermore, the inclined surface may also be formed not only in the standing wall portion 71f and the standing wall portion 73f of the protrusion portion 71e and the protrusion portion 73e of the first wedge 71 and the second wedge 73, but also in the pressing portions of the striker 79 which press the standing wall portion 71f and the standing wall portion 73f. In other words, the inclined surface may also be formed in at least one of the standing wall portions of the wedges and the pressing portions of the striker 79.

In addition, as illustrated in FIGS. 1, 2, and 3, the internal gear 61 and the external gear 63 are attached so as not to be relatively movable in a shaft direction via a connection ring 91.

Next, the operation of the above-described configuration will be described with reference to FIGS. 2, 5, and 6.

(Locked State: Non-Operating State)

As illustrated in FIG. 2, the first wedge 71 and the second wedge 73 receive the biasing force in the direction of being separated from each other from the spring 77, and the outer surface of the standing wall portion 63c of the external gear 63 and the inner surface of the cylindrical standing wall portion 61e (circular hole) of the internal gear 61 are pressed.

The first wedge 71 and the second wedge 73 are biased in a direction in which the internal gear 61 and the external gear 63 increase eccentricity between the rotation axes of both gears by pressing the outer surface of the standing wall portion 63c of the external gear 63 and the inner surface of the cylindrical standing wall portion 61e (circular hole) of the internal gear 61 respectively, the internal teeth 61c of the internal gear 61 and the external teeth 63a of the external gear 63 are deeply engaged with each other, and the seat back 55 does not tilt. (Unlocked State: Operating State) As illustrated in FIG. 5, when an operating button or an operating handle is operated to rotationally drive the driving shaft (not illustrated) in a rightward direction or in a leftward direction in the locked state, the striker 79 rotates in the rightward direction or in the leftward direction. As an example, when the striker 79 rotates counterclockwise in FIGS. 5 and 6, the first protrusion portion 83a of the pressing portion 83 of the striker 79 presses the end surface on the wedge distal end side of the second wedge 73, and the second wedge 73 is moved in the pulling-out direction of the wedge from the narrow portion of the eccentric annular space K.

Figure 5:
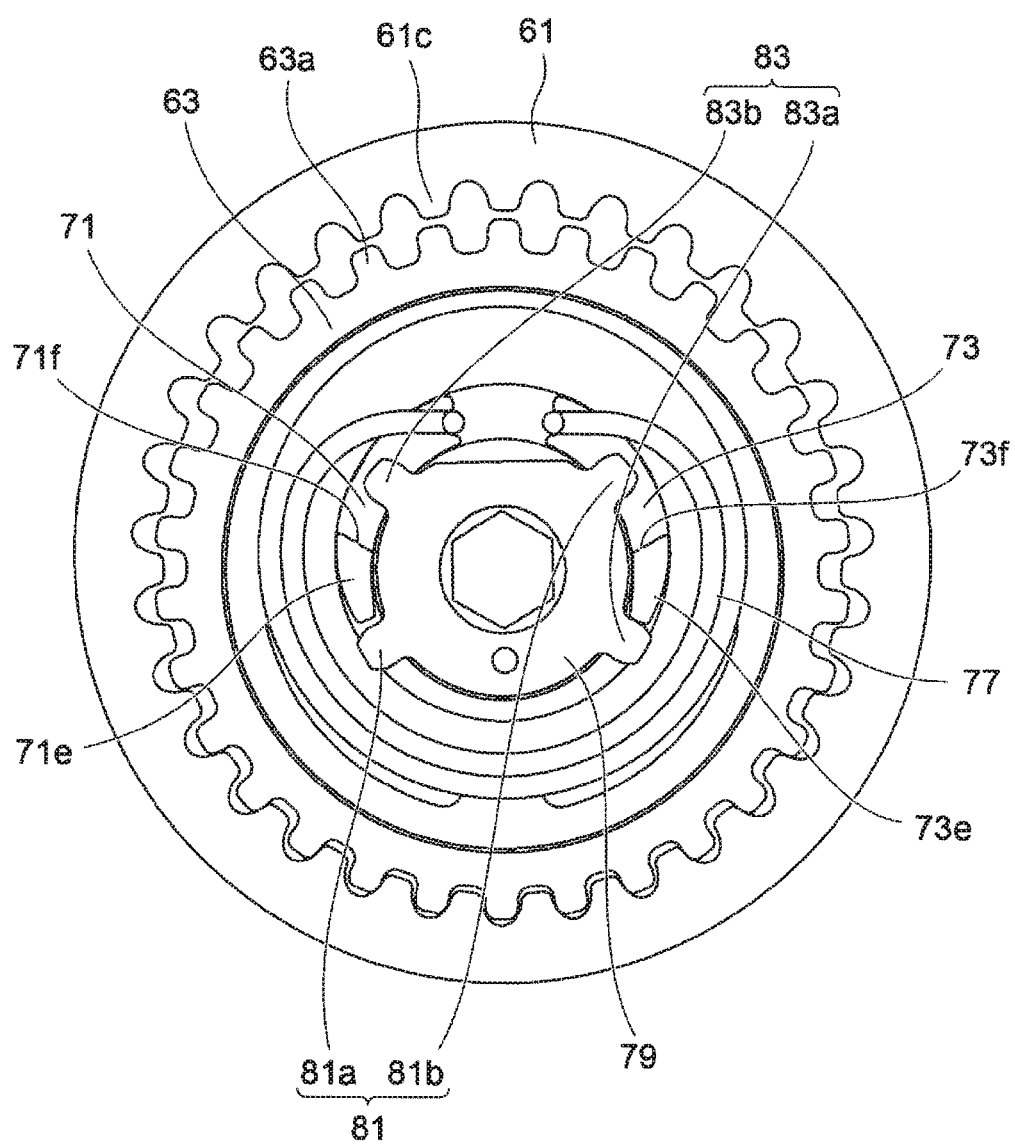
FIG. 5 is a view showing an operation of the reclining apparatus illustrated in FIG. 1.
Figure 6:
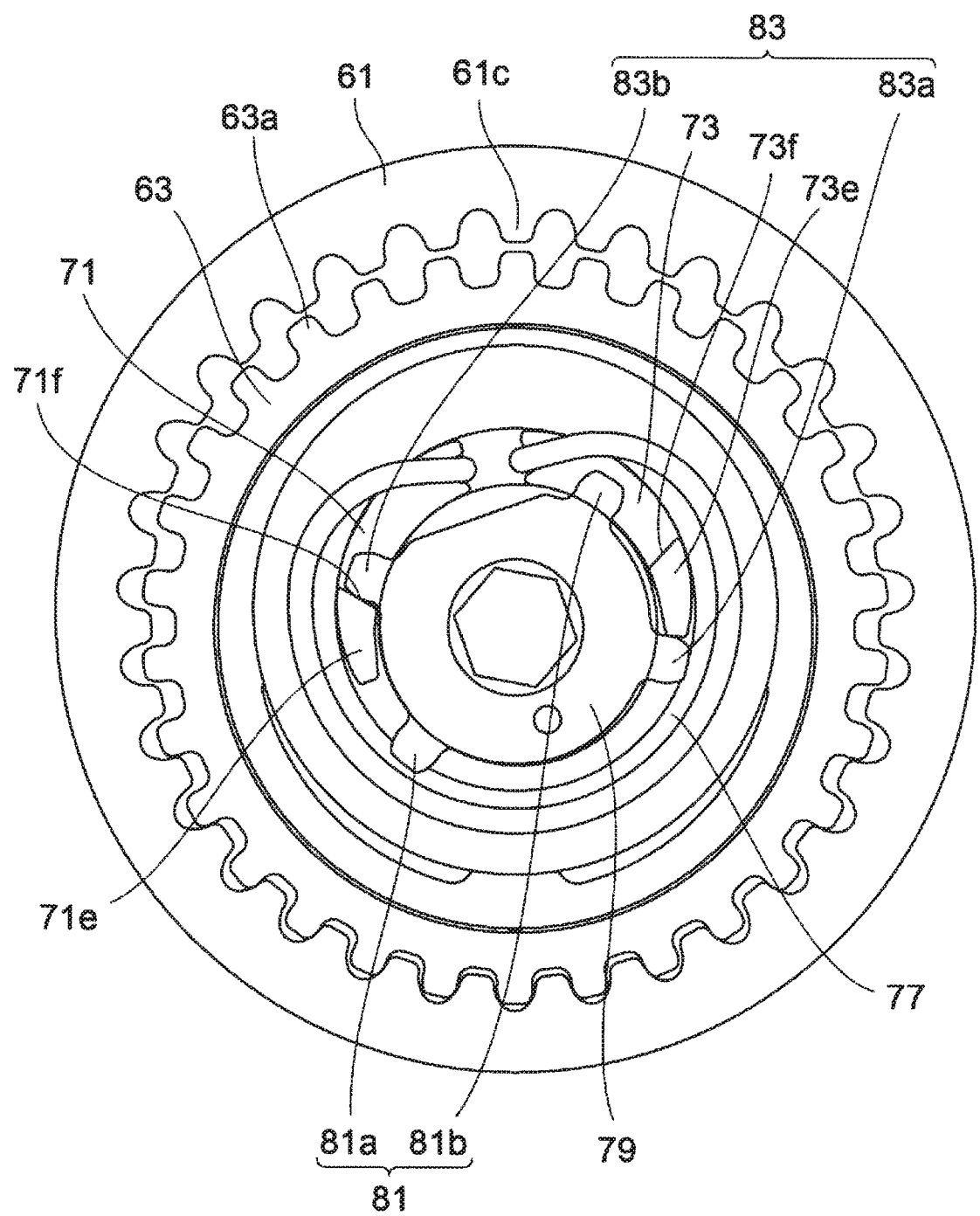
FIG. 6 is a view showing the operation of the reclining apparatus illustrated in FIG. 1.

If the load acting on the seat back 55 is small, as illustrated in FIG. 5, when the second wedge 73 is pushed and moved by the striker 79, the pressing force against the outer surface of the standing wall portion 63c of the external gear 63 of the second wedge 73 and the inner surface of the cylindrical standing wall portion 61e (circular hole) of the internal gear 61 decreases, the engagement between the internal teeth 61c of the internal gear 61 and the external teeth 63a of the external gear 63 becomes shallow, and the seat back is brought into a tiltable state.

At the start of movement of the second wedge 73, the first wedge 71 is stationary due to the friction between the outer surface of the standing wall portion 63c of the external gear 63 and the inner surface of the cylindrical standing wall portion 61e (circular hole) of the internal gear 61. However, when the second wedge 73 moves in the wedge pulling-out direction, the first wedge 71 moves in the driving direction of the wedge into the eccentric annular space K by an elastic repulsive force of the spring 77. While the operation is repeated, the engagement part changes while maintaining the eccentric state between the internal gear 61 and the external gear 63 to tilt the seat back.

In addition, when the load acting on the seat back 55 is large, the friction of the first wedge 71, the outer surface of the standing wall portion 63c of the external gear 63, and the inner surface of the cylindrical standing wall portion 61e (circular hole) of the internal gear 61 increases, and the first wedge 71 does not move only by the elastic repulsive force of the spring 77. In this case, as illustrated in FIG. 6, the striker 79 further rotates counterclockwise, and the second protrusion portion 83b of the pressing portion 83 presses the standing wall portion 71f of the protrusion portion 73e of the first wedge 71, and the first wedge 71 moves in the driving direction of the wedge into the eccentric annular space K.

By the operation, while maintaining the eccentric state between the internal gear 61 and the external gear 63, the engagement part changes and the seat back 55 tilts.

According to such a configuration, the following effects can be obtained.

(1) Even when the positions (wedge lock positions) of the first wedge 71 and the second wedge 73 in the locked state vary due to dimensional variations of the internal gear 61, the external gear 63, the first wedge 71, the second wedge 73, and the striker 79, by selecting the appropriate pressing portions from the plurality of sets of the pressing portions 81 and 83 of the striker 79, it is possible to set the size of a gap between the first wedge 71 and the first protrusion portion 81a of the striker 79 and the size of a gap between the second wedge 73 and the first protrusion portion 83a of the striker 79 to be a substantially predetermined value, and the number of components can be reduced.

(2) The pair of first protrusion portion 81a and the second protrusion portion 81b that constitute the pressing portion 81 are provided within the range of 180 degrees in the rotational direction of the striker 79. Similarly, the pair of the first protrusion portion 83a and the second protrusion portion 83b that constitute the pressing portion 83 are also provided within the range of 180 degrees in the rotational direction of the striker 79, and accordingly, the striker 79 can press each of the first wedge 71 and the second wedge 73 with a simple structure.

(3) In four regions (in FIG. 2, regions E1 to E4) divided by two axes (in FIG. 2, first axis A1 and second axis A2) orthogonal to the rotation axis θ2 of the striker 79 and orthogonal to each other within the plane of the rotation of the striker 79, the first protrusion portion 81a of the pressing portion 81 is positioned in one region (region E1) of one set of two regions (region E1, region E3) having vertically-opposite angles, and the second protrusion portion 81b of the pressing portion 81 is positioned in the other region (region E3). In addition, the first protrusion portion 83a of the pressing portion 83 is positioned in one of the other set of two regions (region E2, region E4) having vertically-opposite angles, and the second protrusion portion 83b of the pressing portion 83 is positioned in the other region (region E4). In other words, by positioning the protrusion portion for pulling out the wedge and the protrusion portion for driving the wedge in two regions having vertically-opposite angles, the striker 79 becomes unlikely to be inclined when the wedge is pressed.

(4) The cross-sectional shape of the fitting hole 79f is symmetrical with the first axis A1 as a symmetrical axis. Accordingly, even when the striker 79 is rotated by 180 degrees from the state of the striker 79 illustrated in FIGS. 1 to 4 and FIG. 8 to change the position, the shape of the fitting hole 79f does not change, and the driving shaft can be fitted without any problem.

(5) Since the first protrusion portions 81a and 83a can press one wedge between the first wedge 71 and the second wedge 73 in the pulling-out direction from the narrow portion of the eccentric annular space K and the second protrusion portions 81b and 83b can press the other wedge between the first wedge 71 and the second wedge 73 in the driving direction into the narrow portion of the eccentric annular space K, the other wedge is timely operated following the operation of the one wedge.

The present invention is not limited to the above-described embodiment. For example, although two pressing portions 81 and 83 are provided as pressing portions in the above-described embodiment, three or more pressing portions may be provided.

In addition, the external gear may be provided on the seat cushion side, and the internal gear may be provided on the seat back side.

Furthermore, a cylinder may be formed in the internal gear, and the circular hole may be formed in the external gear.

Second Embodiment

Figure 11:
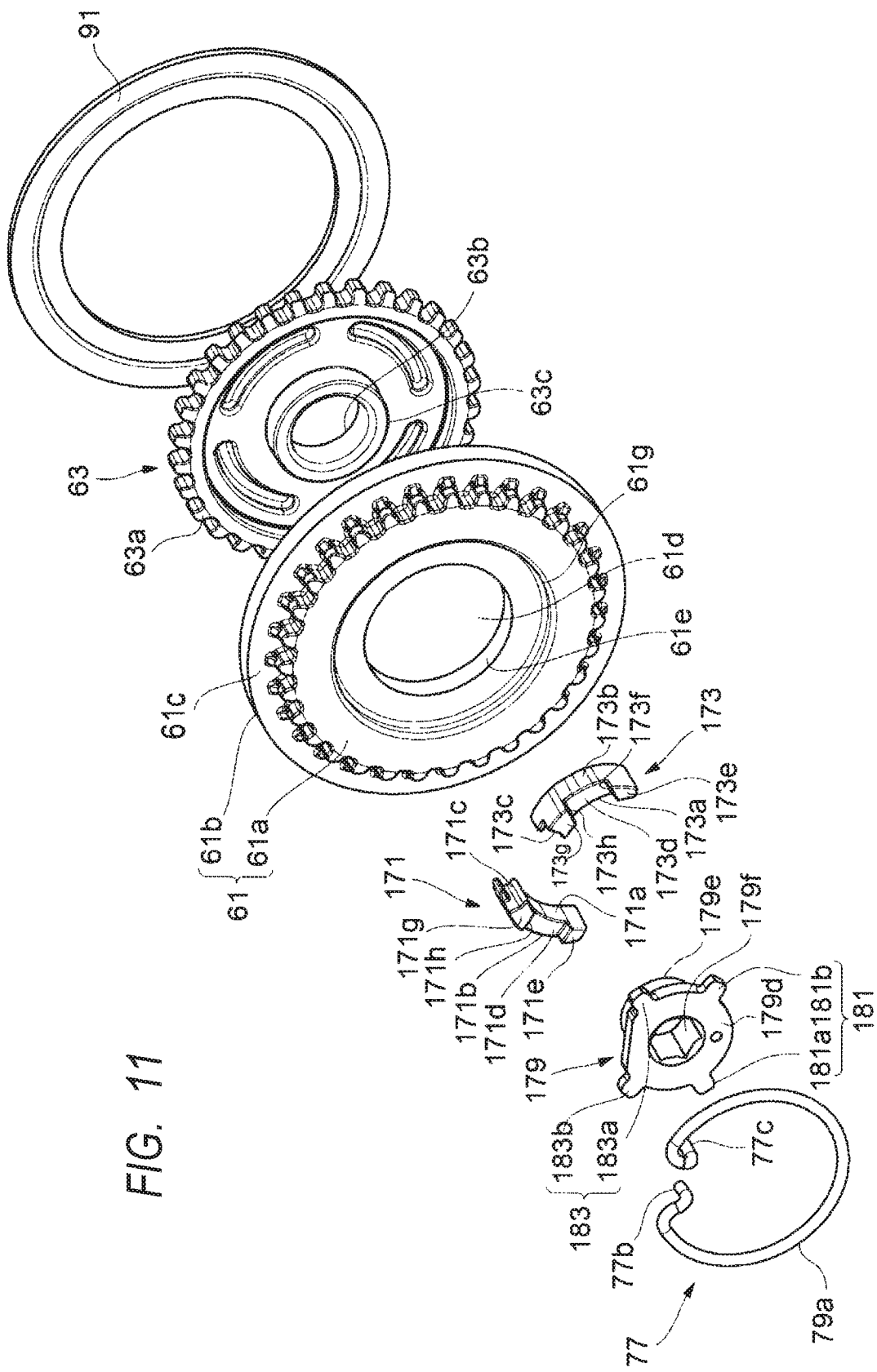
FIG. 11 is an exploded perspective view of a reclining apparatus of a second embodiment.
Figure 12:
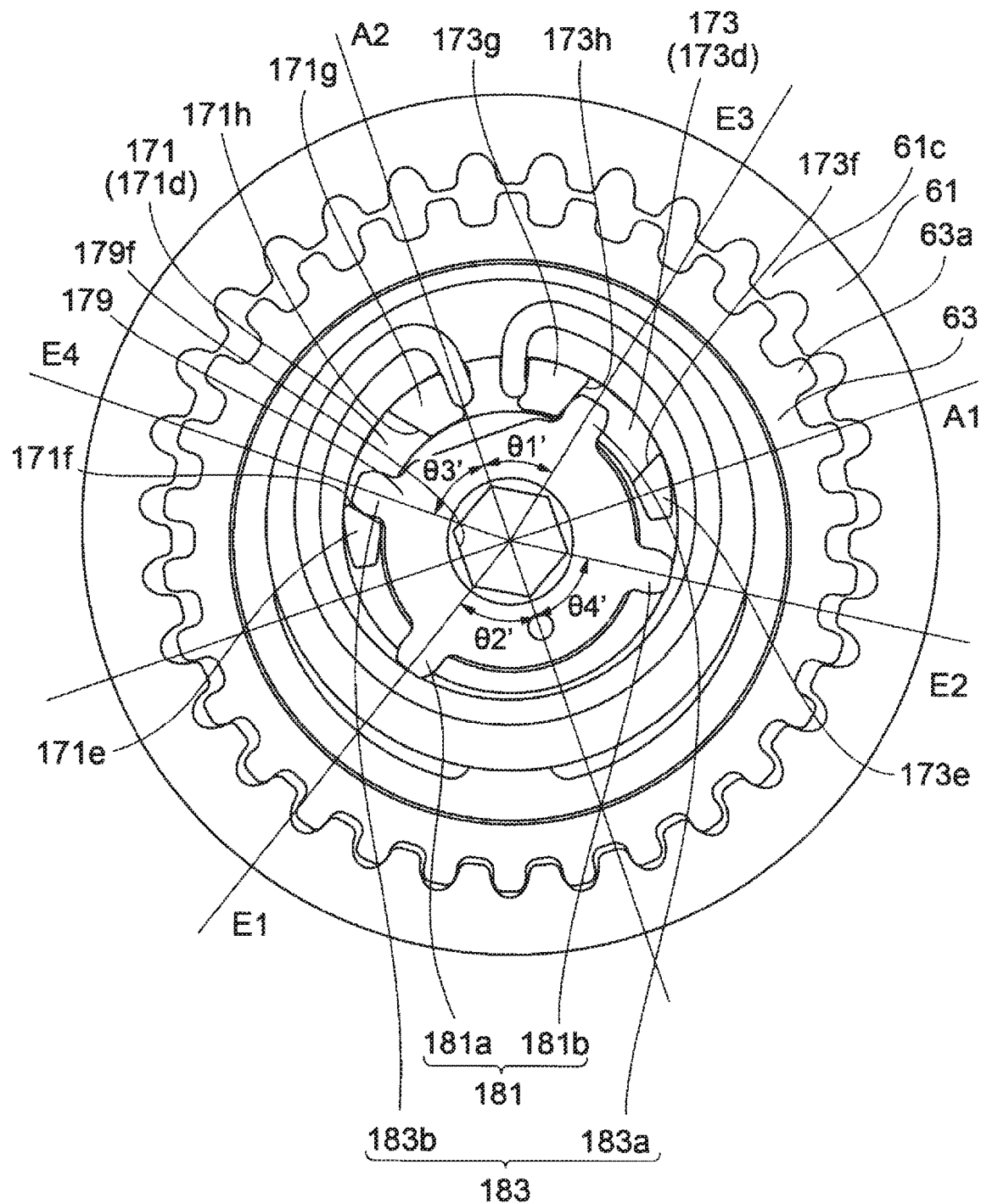
FIG. 12 is a view showing an operation of the reclining apparatus illustrated in FIG. 11.
Figure 13:
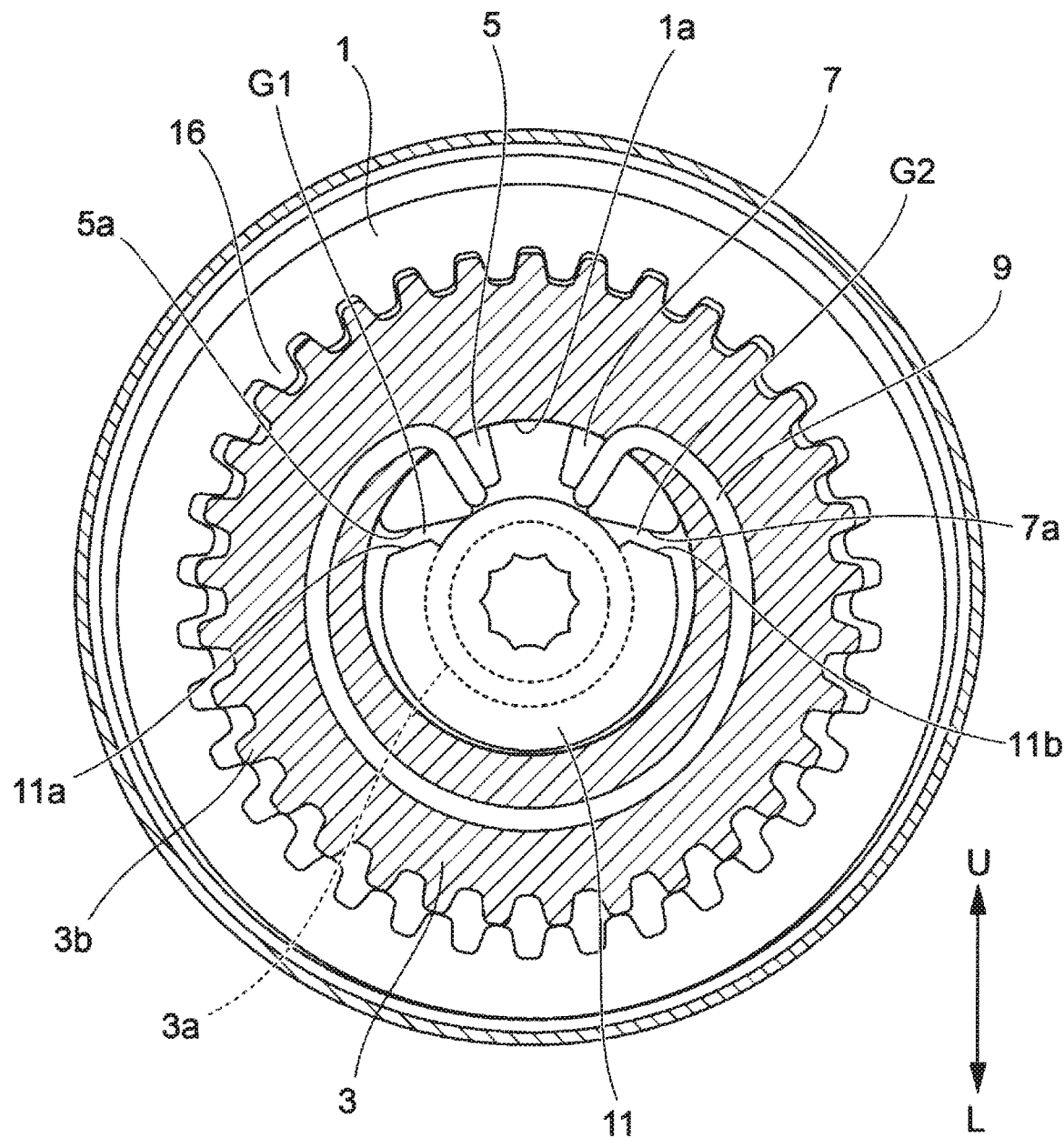
FIG. 13 is a view showing an example of a background art.

Since the difference between the second embodiment and the first embodiment is the striker, the first wedge and the second wedge, and the other parts are the same, the same reference numerals will be given to the same parts and the redundant description thereof will be omitted. In FIGS. 11 and 12, a first wedge 171 and a second wedge 173 are provided in the eccentric annular space K so as to be movable in the peripheral direction. The first wedge 171 and the second wedge 173 have a surface-symmetrical shape. An inner surface 171a and an inner surface 173a of the first wedge 171 and the second wedge 173 have an inner diameter substantially the same as the outer diameter of the standing wall portion 63c of the external gear 63. Further, an outer surface 171b and an outer surface 173b of the first wedge 171 and the second wedge 173 have diameters that are larger than the diameters of the inner surface 171a and the inner surface 173a and have different centers, and thicknesses of the first wedge 171 and the second wedge 173 change to a wedge shape.

In the present embodiment, similar to the first embodiment, the outer contact points that abut against the inner surface of the standing wall portion 61e of the internal gear 61 are formed at two locations on the outer surface 171b and the outer surface 173b of the first wedge 171 and the second wedge 173, and an inner contact point that abuts against the outer surface of the standing wall portion 63c of the external gear 63 is formed at one location on the inner surface 171a and the inner surface 173a of the first wedge 171 and the second wedge 173. Furthermore, the inner contact point is positioned between the two outer contact points. The first wedge 171 and the second wedge 173 are stably held in the eccentric annular space K at the three contact points.

In addition, when the first wedge 171 and the second wedge 173 move in a direction of being separated from each other, that is, in the driving direction of the wedge into the narrow portion of the eccentric annular space K, the internal gear 61 and the external gear 63 relatively move in a direction in which the internal teeth 61c and the external teeth 63a are engaged with each other.

The first wedge 171 and the second wedge 173 receive the biasing force in a direction of being separated from each other from the spring 77 which elastically returns in the diameter expansion direction. The spring 77 includes the annular part 77a of one turn, and the end portion 77b and the end portion 77c that rise up from the annular part 77a. The end portion 77b is locked to a groove portion 171c formed on a thick side end surface of the first wedge 71, and the end portion 77c is locked to a groove portion 173c formed on a thick side end surface of the second wedge 173.

In addition, on thin sides of the upper surface (surface exposed to the groove 61g) 171d and the upper surface 173d that face the groove 61g side of the internal gear 61 of the first wedge 171 and the second wedge 173, a protrusion portion 171e and a protrusion portion 173e that protrude toward the groove 61g side are formed. Further, on the thick side of the upper surface 171d and the upper surface 173d of the first wedge 171 and the second wedge 173, a protrusion portion 171g and a protrusion portion 173g that protrude toward the groove 61g side are formed.

Therefore, on the upper surface 171d and the upper surface 173d of the first wedge 171 and the second wedge 173, except for the protrusion portion 171e, the protrusion portion 173e, the protrusion portion 171g, and the protrusion portion 173g, a recess portion that penetrates in the radial direction is formed. Furthermore, the standing wall portion 171f and the standing wall portion 173f of the protrusion portion 171e and the protrusion portion 173e, and a standing wall portion 171h and a standing wall portion 173h of the protrusion portion 171g and the protrusion portion 173g are pressed portions which can be pressed by the pressing portions of the striker 179.

The difference between the striker 179 of the present embodiment and the striker 79 of the first embodiment is the disposition of the protrusion portion of the pressing portions. Even in the striker 179 of the present embodiment, similar to the first embodiment, two sets of pressing portions configured with the first protrusion portions and the second protrusions portion capable of pressing the first wedge 171 and the second wedge 173 are formed.

As illustrated in FIG. 12, in four regions (in FIG. 12, regions E1 to E4) divided by two axes (in FIG. 12, first axis A1 and second axis A2) orthogonal to the rotation axis θ2 of the striker 179 and orthogonal to each other within the plane of the rotation of the striker 179, the first protrusion portion 183a of one pressing portion 183 is positioned in one region (region E3) of one adjacent regions E3 and E4, and the second protrusion portion 183b of the pressing portions 183 is positioned in the other region (region E4). In addition, the second protrusion portion 181b of the other pressing portion 181 is positioned in one region (region E2) of the other two adjacent regions (region E1 and region E2), and the first protrusion portion 181a of the pressing portion 181 is positioned in the other region (region E1).

As illustrated in FIG. 12, in the two sets of pressing portion 181 and pressing portion 183, when an angle at which a straight line passing through the first protrusion portion 183a of the one pressing portion 183 and the center (rotation axis) θ2 of the fitting hole 179f intersects the second axis A2 is θ1', an angle at which a straight line passing through the first protrusion portion 181a of the other pressing portion 181 and the center of the fitting hole 179f intersects the second axis A2 is θ2', an angle at which a straight line passing through the second protrusion portion 183b of the one pressing portion 183 and the center of the fitting hole 179f intersects the second axis A2 is θ3', and an angle at which a straight line passing through the second protrusion portion 181b of the other pressing portion 181 and the center of the fitting hole 179f intersects the second axis A2 is θ4',

θ1'=θ3',

θ2'=θ4', and

θ1'=θ3'≠θ2'=θ4'.

Furthermore,

θ1'=θ3'<θ2'=θ4' is satisfied.

When the striker 179 rotates counterclockwise, the first protrusion portion 183a presses the standing wall portion 171h of the protrusion portion 173g of the second wedge 173, and the second wedge 173 is moved in the pulling-out direction of the wedge from the narrow portion of the eccentric annular space K. In addition, the second protrusion portion 183b presses the standing wall portion 171f of the protrusion portion 171e of the first wedge 171, and the first wedge 171 is moved in the driving direction of the wedge into the narrow portion of the eccentric annular space K. Conversely, in FIG. 12, when the striker 179 rotates clockwise, the first protrusion portion 183a presses the standing wall portion 173f of the protrusion portion 173e of the second wedge 173, and the second wedge 173 is moved in the driving direction of the wedge into the narrow portion of the eccentric annular space K. In addition, the second protrusion portion 183b presses the standing wall portion 171h of the protrusion portion 171g of the first wedge 171, and the first wedge 171 is moved in the pulling-out direction of the wedge from the narrow portion of the eccentric annular space K.

By satisfying θ1'=θ3' and θ2'=θ4', even when the striker 179 is rotated by 180 degrees from the state of the striker 179 illustrated in FIG. 12 to change the position, the first wedge 171 and the second wedge 173 can be pressed and moved. In this case, when the striker 179 rotates counterclockwise, the first protrusion portion 181a presses the standing wall portion 173h of the protrusion portion 173g of the second wedge 173, and the first wedge 171 is moved in the pulling-out direction of the wedge from the narrow portion of the eccentric annular space K. In addition, the second protrusion portion 181b presses the standing wall portion 171f of the protrusion portion 171e of the first wedge 171, and the first wedge 171 is moved in the driving direction of the wedge into the narrow portion of the eccentric annular space K. Conversely, when the striker 179 rotates clockwise, the first protrusion portion 181a presses the standing wall portion 173f of the protrusion portion 173e of the second wedge 173, and the second wedge 173 is moved in the driving direction of the wedge into the narrow portion of the eccentric annular space K. In addition, the second protrusion portion 181b presses the standing wall portion 171h of the protrusion portion 171g of the first wedge 171, and the first wedge 171 is moved in the pulling-out direction of the wedge from the narrow portion of the eccentric annular space K.

At this time, since θ1'=θ3'<θ2'=θ4', when the wedge lock position is high, it is sufficient that the first protrusion portion 183a and the second protrusion portion 183b of the pressing portion 183, in which the angles at which the straight line passing through the protrusion portion and the center of the fitting hole 79f intersects the second axis A2 are small θ1' and θ2', press and move the first wedge 171 and the second wedge 173. In addition, when the wedge lock position is low, it is sufficient that the first protrusion portion 181a and the second protrusion portion 181b of the pressing portion 181, in which the angles at which the straight line passing through the protrusion portion and the center of the fitting hole 179f intersects the second axis A2 have large θ2' and θ4', press and move the first wedge 171 and the second wedge 173.

The operation of the reclining apparatus having such a configuration will be described.

(Locked State: Non-Operation State)

The first wedge 171 and the second wedge 173 receive the biasing force in the direction of being separated from each other from the spring 77, and the outer surface of the standing wall portion 63c of the external gear 63 and the inner surface of the cylindrical standing wall portion 61e (circular hole) of the internal gear 61 are pressed.

The first wedge 171 and the second wedge 173 are biased in a direction in which the internal gear 61 and the external gear 63 increase eccentricity between the rotation axes of both gears by pressing the outer surface of the standing wall portion 63c of the external gear 63 and the inner surface of the cylindrical standing wall portion 61e (circular hole) of the internal gear 61 respectively, the internal teeth 61c of the internal gear 61 and the external teeth 63a of the external gear 63 are deeply engaged with each other, and the seat back 55 does not tilt. (Unlocked State: Operating State)

When the operating button or the operating handle is operated to rotationally drive the driving shaft (not illustrated) in the rightward direction or in the leftward direction in the locked state, the striker 179 rotates in the rightward direction or in the leftward direction. In FIG. 11, when the striker 179 rotates counterclockwise, the first protrusion portion 183a of the pressing portion 183 of the striker 179 presses the standing wall portion 173h of the second wedge 173, and the second wedge 173 is moved in the pulling-out direction of the wedge from the narrow portion of the eccentric annular space K.

If the load acting on the seat back 55 is small, when the second wedge 173 is pushed and moved by the striker 179, the pressing force against the outer surface of the standing wall portion 63c of the external gear 63 of the second wedge 173 and the inner surface of the cylindrical standing wall portion 61e (circular hole) of the internal gear 61 decreases, the engagement between the internal teeth 61c of the internal gear 61 and the external teeth 63a of the external gear 63 becomes shallow, and the seat back becomes in a tiltable state.

At the start of movement of the second wedge 173, the first wedge 171 is stationary due to the friction between the outer surface of the standing wall portion 63c of the external gear 63 and the inner surface of the cylindrical standing wall portion 61e (circular hole) of the internal gear 61. However, when the second wedge 173 moves in the wedge pulling-out direction, the first wedge 171 moves in the driving direction of the wedge into the eccentric annular space K by the elastic repulsive force of the spring 77. While the operation is repeated, the engagement part changes while maintaining the eccentric state between the internal gear 61 and the external gear 63 to tilt the seat back.

In addition, when the load acting on the seat back 55 is large, the friction of the first wedge 171, the outer surface of the standing wall portion 63c of the external gear 63, and the inner surface of the cylindrical standing wall portion 61e (circular hole) of the internal gear 61 increases, and the first wedge 171 does not move only by the elastic repulsive force of the spring 77.

In this case, as illustrated in FIG. 12, the striker 179 further rotates counterclockwise, and the second protrusion portion 183b of the pressing portion 183 pushes the standing wall portion 171f of the protrusion portion 171e of the first wedge 171, and the first wedge 171 moves in the driving direction of the wedge into the eccentric annular space K.

By the operation, while maintaining the eccentric state between the internal gear 61 and the external gear 63, the engagement part changes and the seat back 55 tilts.

Even with such a configuration, the same effect as that of the first embodiment can be obtained.

Although the embodiments of the present invention have been described above, it is needless to say that the technical scope of the present invention should not be interpreted in a limited manner by the description of the present embodiments. It is understood by those skilled in the art that the present embodiments are merely examples, and that various modifications of the embodiments can be made within the scope of the invention described in the claims. The technical scope of the present invention should be determined based on the scope of the invention described in the claims and the scope of equivalents thereof.

The present application is based on Japanese Patent Application No. 2016-224106, filed on Nov. 17, 2016, the contents of which are incorporated herein by reference.

The invention claimed is:

1. A reclining apparatus comprising:
an internal gear, which has internal teeth formed on an inner peripheral surface thereof, is provided in a member on one side of a seat cushion side and a seat back side, and is formed in any one shape of a circular hole and a cylinder;
an external gear, which is engaged with the internal teeth of the internal gear, has external teeth that has a smaller number of teeth than that of the internal teeth and are formed on an outer peripheral surface thereof, and on which a cylinder to be inserted into a circular hole is formed in a case where the circular hole is formed in the internal gear, and a circular hole into which a cylinder is inserted is formed in a case where the cylinder is formed in the internal gear, and which is provided in a member on the other side of the seat cushion side and the sea back side;
a first wedge and a second wedge, which are provided to be movable along a peripheral direction in an eccentric annular space between an inner surface of the circular hole and an outer surface of the cylinder;
a biasing member, which biases the first wedge and the second wedge in a direction into a narrow portion of the eccentric annular space; and
a striker, which has a pressing portion having a pair of first protrusion portions and second protrusion portions capable of pressing the first wedge and the second wedge,
wherein the striker has a plurality of the pressing portions,
wherein the plurality of pressing portions are two of the pressing portions, and
wherein four regions divided by a first axis orthogonal to the rotation axis of the striker and a second axis orthogonal to the rotation axis and the first axis,
the first protrusion portion of the one pressing portion is positioned in one region of one set of two regions having vertically-opposite angles, and the second protrusion portion of the one pressing portion is positioned in the other region thereof, and
the first protrusion portion of the other pressing portion is positioned in one region of another set of two regions having vertically-opposite angles, and the second protrusion portion of the other pressing portion is positioned in the other region thereof.

2. The reclining apparatus according to claim 1
wherein the striker has a fitting hole into which a driving shaft fits, and
wherein if an angle at which a straight line passing through the first protrusion portion of the one pressing portion of the two pressing portions and the center of the fitting hole intersects the second axis is θ1,
an angle at which a straight line passing through the first protrusion portion of the other pressing portion of the two pressing portions and the center of the fitting hole intersects the second axis is θ2, an angle at which a straight line passing through the second protrusion portion of the other pressing portion and the center of the fitting hole intersects the second axis is θ3, and an angle at which a straight line passing through the second protrusion portion of the one pressing portion and the center of the fitting hole intersects the second axis is θ4,

θ1=θ2,

θ3=θ4, and

θ2≠θ3.

3. The reclining apparatus according to claim 2, wherein a cross-sectional shape of the fitting hole is a symmetrical shape with the first axis as a symmetrical axis.

4. A reclining apparatus comprising:
an internal gear, which has internal teeth formed on an inner peripheral surface thereof, is provided in a member on one side of a seat cushion side and a seat back side, and is formed in any one, shape of a circular hole and cylinder;
an external gear, which is engaged with the internal teeth of the internal gear, has external teeth that has a smaller number of teeth than that of the internal teeth and are formed on an outer peripheral surface thereof, and on which a cylinder to be inserted into a circular hole is formed in a case where the circular hole is formed in the internal gear, and a circular hole into which a cylinder is inserted is formed in a case where the cylinder is formed in the internal gear, and which is provided in a member on the other side of the seat cushion side and the seat back side;
a first wedge and a second wedge, which are provided to be movable along a peripheral direction in an eccentric annular space between an inner surface of the circular hole and an outer surface of the cylinder;
a biasing member, which biases the first wedge and the second wedge in a direction into a narrow portion of the eccentric annular space; and
a striker, which has a pressing portion having a pair of first protrusion portions and second protrusion portions capable of pressing the first wedge and the second wedge,
wherein the striker has a plurality of the pressing portions,
wherein the plurality of pressing portions are two pressing portions, and
wherein in four regions divided by a first axis orthogonal to the rotation axis of the striker and a second axis orthogonal to the rotation axis and the first axis,
the first protrusion portion of the one pressing portion is positioned in one region of one set of two adjacent regions, and the second protrusion portion of the one pressing portion is positioned in the other region, and
the first protrusion portion of the other pressing portion is positioned in one region of another set of two adjacent regions, and the second protrusion portion of the other pressing portion is positioned in the other region,
wherein the striker has a fitting hole into which a driving shaft fits, and
wherein if an angle at which a straight line passing through the first protrusion portion of the one pressing portion of the two pressing portions and the center of the fitting hole intersects the second axis is θ1',
an angle at which a straight line passing through the first protrusion portion of the other pressing portion of the two pressing portions and the center of the fitting hole intersects the second axis is θ2',
an angle at which a straight line passing through the second protrusion portion of the one pressing portion and the center of the fitting hole intersects the second axis is θ3', and
an angle at which a straight line passing through the second protrusion portion of the other pressing portion and the center of the fitting hole intersects the second axis is θ4',

θ1'=θ3',

θ2'=θ4', and

θ3'≠θ2'.

5. The reclining apparatus according to claim 4, wherein a cross-sectional shape of the fitting hole is a symmetrical shape with the first axis as a symmetrical axis.

6. A reclining apparatus comprising:
an internal gear, which has internal teeth formed on an inner peripheral surface thereof, is provided in a member on one side of a seat cushion side and a seat back side, and is formed in any one shape of a circular hole and a cylinder;
an external gear, which is engaged with the internal teeth of the internal gear, has external teeth that has a smaller number of teeth than that of the internal teeth and are formed on outer peripheral surface thereof, and on which a cylinder to be inserted into a circular hole is formed in a case where the circular hole is formed in the internal gear, and a circular hole into which a cylinder is inserted is formed in a case where the cylinder is formed in the internal gear, and which is provided in a member on the other side of the seat cushion side and the seat back side;
a first wedge and a second wedge, which are provided to be movable along a peripheral direction in an eccentric annular space between an inner surface of the circular hole and an outer surface of the cylinder;
a biasing member, which biases the first wedge and the second wedge in a direction into a narrow portion of the eccentric annular space; and
a striker which has a pressing portion having a pair of first protrusion portions and second protrusion portions capable of pressing the first wedge and the second wedge,
wherein the striker has a plurality of the pressing portions, wherein
the first protrusion portion is capable of pressing one wedge between the first wedge and the second wedge in a pulling-out direction from the narrow portion of the eccentric annular space, and
the second protrusion portion is capable of pressing the other one wedge between the first wedge and the second wedge in a driving direction into the narrow portion of the eccentric annular space.

* * * * *